United States Patent [19]
Lee

[11] 3,898,612
[45] Aug. 5, 1975

[54] HEADLIGHT BUZZER SYSTEM

[76] Inventor: Maw-Huei Lee, 251 Tenth St., N.W., Atlanta, Ga. 30318

[22] Filed: Dec. 6, 1973

[21] Appl. No.: 422,418

Related U.S. Application Data

[63] Continuation-in-part of Ser. No. 354,934, April 27, 1973.

[52] U.S. Cl. .................... 340/52 D; 315/82
[51] Int. Cl. ............................ G08b 21/00
[58] Field of Search ............ 340/52 D, 52 F, 52 R; 315/82; 307/10 BP

[56] References Cited
UNITED STATES PATENTS

| | | | |
|---|---|---|---|
| 2,507,398 | 5/1950 | Castro | 315/82 X |
| 2,799,843 | 7/1957 | Savino | 340/52 D |
| 3,072,884 | 1/1963 | Hughes | 340/52 D |

*Primary Examiner*—Alvin H. Waring
*Attorney, Agent, or Firm*—B. J. Powell

[57] ABSTRACT

A headlight warning system including a buzzer unit having a coil serially connected with a coil actuated switch and a current limiting device. One side of the coil is connected to ground; and the opposite side of the coil is connected to a power source through the ignition switch in a first circuit and to the power source through the coil actuated switch and the headlight switch in a second circuit. The current limiting device connects the first and second circuits to limit the current flow from the first circuit to the second circuit through the coil actuated switch.

3 Claims, 5 Drawing Figures

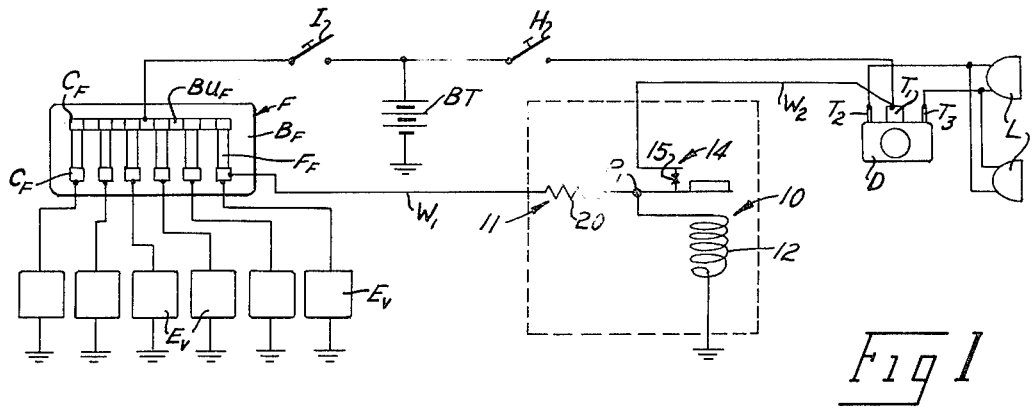
Fig 1
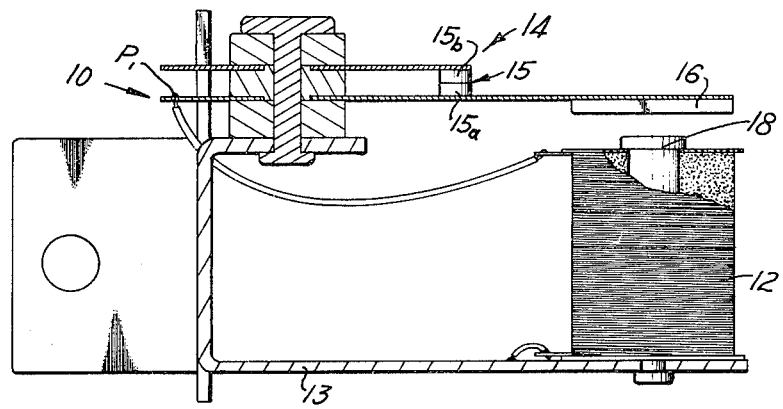
Fig 2
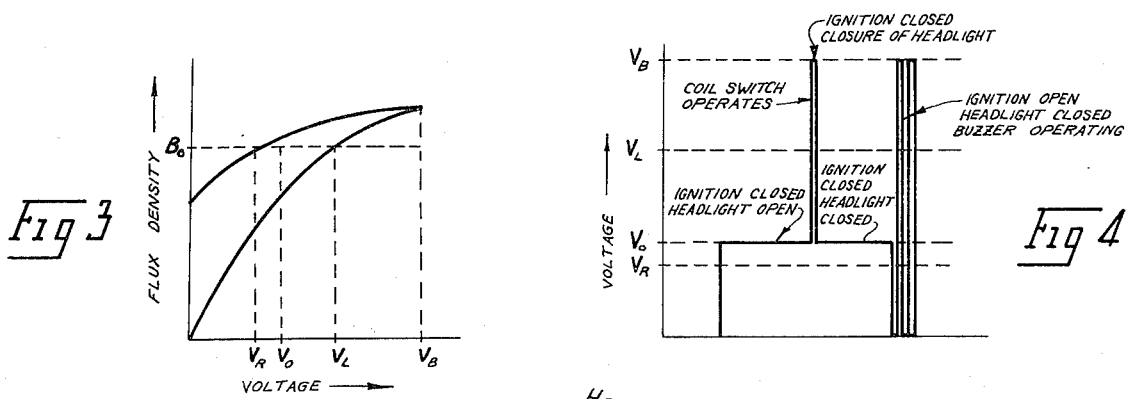
Fig 3
Fig 4
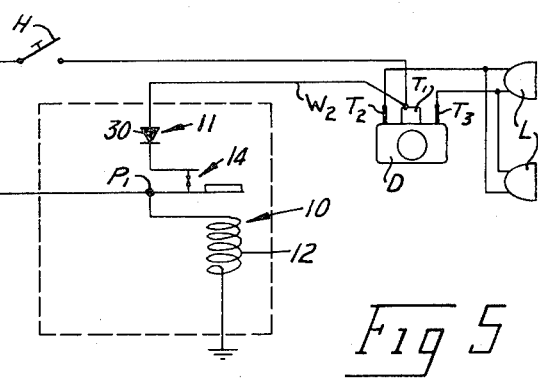
Fig 5

HEADLIGHT BUZZER SYSTEM

CROSS-REFERENCE TO RELATED APPLICATION

This application is a continuation-in-part of my copending application Ser. No. 354,934, filed Apr. 27, 1973 for "Headlight Warning System."

BACKGROUND OF THE INVENTION

Many times drivers inadvertently leave their automobile headlights switched on when they leave the vehicle. Because the headlights are connected directly to the battery independently of the ignition switch, the power in the battery is expended if the automobile is unattended for any substantial period of time. This causes the driver to be unable to start the vehicle upon his return thereby necessitating expenses in starting the vehicle from an outside power source and recharging the battery. Some automotive manufacturers are adding an automatic headlight switch circuit which disables the headlights a predetermined period of time after the ignition switch has been turned off, however, such circuits are relatively expensive and are available on only a relatively few vehicles. While a few separately manufactured warning systems are available, such systems are generally expensive to manufacture and complicated in construction.

SUMMARY OF THE INVENTION

These and other problems and disadvantages are overcome by the invention disclosed herein by providing an alarm which notifies the driver of a vehicle when the headlights are inadvertently switched on, which is inexpensive, which can be easily installed on the vehicle without any tools by the owner, and which does not affect the operation of the original circuitry associated with the headlights of the vehicle. Moreover, the invention can be easily installed on the vehicle even after the original manufacture thereof without affecting the operation of the existing circuitry of the vehicle.

The apparatus of the invention includes a buzzer unit having an electromagnetic coil and a buzzer switch whose normally closed contacts are opened in response to the coil being energized. The hot side of the coil is connected to one of the contacts and the ground side of the coil is connected directly to the vehicle ground. The hot side of the coil is also connected to the vehicle battery through the ignition switch in a first circuit in parallel with the contact on the buzzer switch. The other contact of the buzzer switch is connected to the vehicle battery through the headlight switch in a second circuit. The current limiting device is connected between the first and second circuits through the buzzer switch to limit the current flow from the first circuit to the second circuit. Thus, the buzzer unit will not emit a signal when the ignition switch is closed regardless of whether the headlight switch is closed, but will emit a signal when the ignition switch is open and the headlight switch is closed.

These and other features and advantages of the invention disclosed herein will become more fully understood upon consideration of the following specification and accompanying drawings wherein like characters of reference designate corresponding parts throughout the several views and in which:

BRIEF DESCRIPTION OF THE DRAWINGS

FIG. 1 is an electrical schematic diagram of the invention;

FIG. 2 is a cross-sectional view illustrating a buzzer unit for the invention;

FIG. 3 is a typical operating voltage diagram for the buzzer unit;

FIG. 4 is a diagram illustrating the operation of the invention; and,

FIG. 5 is an electrical schematic diagram for an alternate embodiment of the invention.

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Referring to the drawings, it will be seen that the invention makes use of the existing battery B, ignition switch I and headlight switch H of a vehicle. The invention may also use the existing fuse block F and headlight dimmer switch D as convenient connection points.

Referring now to FIG. 1, it will be seen that the invention includes a buzzer unit 10 and a current limiting device 11. The buzzer unit 10 as seen in FIG. 2 includes an electromagnetic coil 12 which operates a switch 14 having normally closed contacts 15. Both coil 12 and switch 14 are mounted in frame 13. A ferromagnetic member 16 is operatively connected to the contacts 15 and operatively associated with coil 12 so that when the coil 12 is energized, the member 16 will be magnetically drawn toward the coil to open contacts 15. The switch 14 is serially connected to coil 12 so that when a voltage is applied to the coil 12 sufficient to open switch 14, the coil 12 will be rapidly energized and deenergized. The striking of the member 16 against the end of core 18 in coil 12 causes the audible buzzing signal to be emitted.

The hysteresis of the ferromagnetic core 18 is such that a higher voltage is required to open contacts 15 than to release the contacts so that they close. Reference to FIG. 3 shows the characteristics involved. Because the number of turns and length of conductor are known from the coil and since the current through the coil varies directly with the voltage, the magnetic flux density in the core 18 varies with voltage as seen in FIG. 3. Thus, during magnetization of core 18, the flux density in the core is indicated by the right hand curve in FIG. 3 while the flux density in the core during demagnetization is indicated by the left hand curve in FIG. 3. The flux density level necessary to operate the switch 14 is shown by the line labelled $B_o$. By following the magnetization curve, it will be seen that a voltage $V_L$ is required to reach a sufficient flux density level to operate the switch 14. On the other hand, it will be seen from following the demagnetization curve that a lower voltage $V_R$ must be reached before the flux density level drops below that necessary to maintain the switch open. The invention takes advantage of this feature in its operation.

The hot side of the coil 12 is connected to the contact $15_a$ while its ground side is connected to the vehicle ground as seen in FIG. 1. The current limiting device 11 shown in FIG. 1 is a resistor 20. The resistor 20 is connected to the common point between the hot side of the coil 12 and the contact $15_a$.

Referring now to FIG. 1, a representative existing fuse block F is illustrated. The block F includes a mounting base $B_F$ onto which a series of pairs of spring contacts $C_F$ are positioned. One contact $C_F$ of each pair is connected to the vehicle battery BT through the ignition switch I via a common bus $BU_F$. Fuses $F_F$ are slipped into position between the contacts $C_F$ to fuse equipment $E_v$ individually connected to the other contacts $C_F$. This allows the equipment $E_v$ to be operated only while the ignition switch I is closed.

The other side of resistor 20 is connected through wire $w_1$ to any of contacts $C_F$ that are connected to the battery BT through ignition switch I. Thus, when the switch I is closed, the battery voltage will be imposed on resistor 20.

A representative existing, foot-operated dimmer switch D is also illustrated in FIG. 1. Switch D has three blade type terminals $T_1$, $T_2$ and $T_3$. The middle terminal $T_1$ is normally the common terminal which is connected to the battery BT through the headlight switch H. The side terminals $T_2$ and $T_3$ are normally connected to the high and low beam inputs respectively of the headlights L. Switch D is effective in a first condition to connect terminal $T_1$ with terminal $T_2$ and effective in a second condition to connect terminal $T_1$ with terminal $T_3$.

The other contact $15_b$ is connected to the terminal $T_1$ through wire $w_2$ so that when the headlight switch H is closed, the voltage of battery BT will be imposed on the contact $15_b$. Thus, when the ignition switch I is closed, a voltage $V_o$ from battery BT will be imposed at the common point $P_1$ between coil 12 and contact $15_a$ while the full battery voltage will be imposed on contact $15_b$ when the headlight switch I is closed.

In operation, it will be seen that closing ignition switch I will impose voltage $V_o$ at point $P_1$. Because the resistance of the headlights L is very low, the resistor 20 serves to limit the voltage at point $P_1$ sufficiently so that the current flow through the headlights L is below that necessary to illuminate the headlights. This also imposes the voltage $V_o$ across coil 12 but this voltage is considerably lower than that necessary to operate the coil as seen in FIG. 4. When the headlight switch H is closed, the battery voltage is imposed on contact $15_b$. Since the switch 14 is normally closed, the battery voltage is imposed across coil 12 to cause it to operate switch 14 to open contacts $15_a$ and $15_b$. This disconnects the voltage from the battery BT through headlight switch H from coil 12, however, the voltage $V_o$ at point $P_1$ is now imposed across coil 12. Because voltage $V_o$ is above the release voltage $V_R$ for the coil 12, the coil 12 continues to hold the switch 14 open to prevent the buzzer unit 10 from emitting an audible buzzing signal. When the ignition switch I is opened, while the headlight switch H remains closed, the voltage $V_o$ is removed from the coil 12. This allows the switch 14 to close and the buzzer unit 10 to emit the audible buzzing signal in its normal operation. The resistor 20 serves to limit the current flow from the fuse block F through the headlights L when the ignition switch I is closed and the headlight switch H is open to prevent the fuse $F_F$ through which the point $P_1$ is connected to the first circuit from being blown, especially if the coil 12 is not properly grounded.

The value of the resistor 20 is selected so that the current flow through the headlight circuit from the fuse block F is within the current capability of the fuse $F_F$ and so that the voltage $V_o$ imposed across the coil 12 is greater than the voltage $V_R$ below which the coil 12 releases the switch 14 when the switch 14 is open. Preferrably the valve of resistor 20 should be one to three times the resistance of coil 12. One valve that has been found satisfactory is twice the resistance of coil 12.

An alternate embodiment of the invention is shown in FIG. 5. Those components common to the first embodiment have like characters of reference applied thereto. The current limiting means 11 seen in FIG. 5 is a diode 30 connected between the contact $15_b$ and the dimmer switch D. The diode 30 diode arranged so that current is allowed to flow from switch D to contact $15_b$ but not from contact $15_b$ to switch D. Thus, an overload on the fuse $F_F$ is prevented while switch 14 is closed.

It will be noted in operation that closing the ignition switch I causes the coil 12 to be energized to open switch 14 and maintain it open until the ignition switch is opened. If the headlight switch H is closed when the ignition switch I is open, the diode 30 allows current to flow through switch 14 and coil 12 to operate the buzzer unit 10 to emit an audible warning signal.

While specific embodiments of the invention have been disclosed herein, it is to be understood that full use may be made of modifications, substitutions and equivalents without departing from the scope of the invention.

I claim:

1. A headlight warning system for use on a vehicle having a first circuit connected to the vehicle battery by an ignition switch and a second circuit connected to the vehicle battery through a headlight switch independently of the ignition switch for controlling the operation of the headlights, said system comprising:

buzzer means for generating an audible warning signal upon receipt of a prescribed electrical signal, said buzzer means including an electromagnetic coil and a magnetically responsive switch operatively associated with said coil, said switch having a pair of normally closed contacts opened when a voltage greater than a first prescribed value less than the vehicle battery voltage is imposed on said coil and released to reclose when the voltage imposed on said coil falls below a second prescribed value less than said first prescribed value, one side of said coil electrically connected to one of said pair of contacts and the other side of said coil electrically grounded, the other of said contacts electrically connected to said second circuit so that the vehicle battery voltage is imposed on said other of said pair of contacts when the headlight switch is closed; and, a resistor electrically connecting the common point between said coil and said one of said contacts to said first circuit so that voltage is supplied to said common point through said resistor when the ignition switch is closed, said resistor having a predetermined electrical resistance value such that a voltage having a third prescribed value greater than said second prescribed value and less than said first prescribed value is imposed on said coil from the vehicle battery through said first circuit when the ignition switch is closed.

2. The headlight warning system of claim 1 wherein said predetermined electrical resistance value of said resistor is one-three times the electrical resistance value of said electromagnetic coil.

3. The headlight warning system of claim 1 wherein said predetermined electrical resistance value of said resistor is twice the electrical resistance value of said electromagnetic coil.

* * * * *